United States Patent
Gatt et al.

(10) Patent No.: US 9,523,046 B2
(45) Date of Patent: Dec. 20, 2016

(54) COMO AND NIMO CATALYST STACKING FOR RENEWABLE DIESEL

(71) Applicants: Joseph E. Gatt, Beaumont, TX (US); Bradley R. Fingland, Annandale, NJ (US); William E. Lewis, Baton Rouge, LA (US); Patrick L. Hanks, Bridgewater, NJ (US)

(72) Inventors: Joseph E. Gatt, Beaumont, TX (US); Bradley R. Fingland, Annandale, NJ (US); William E. Lewis, Baton Rouge, LA (US); Patrick L. Hanks, Bridgewater, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 393 days.

(21) Appl. No.: 14/097,582

(22) Filed: Dec. 5, 2013

(65) Prior Publication Data
US 2014/0179976 A1 Jun. 26, 2014

Related U.S. Application Data

(60) Provisional application No. 61/740,497, filed on Dec. 21, 2012.

(51) Int. Cl.

| | | |
|---|---|---|
| C07C 1/00 | (2006.01) | |
| C10G 65/00 | (2006.01) | |
| C10G 65/02 | (2006.01) | |
| C10G 45/08 | (2006.01) | |
| C10G 65/04 | (2006.01) | |
| C10G 3/00 | (2006.01) | |

(52) U.S. Cl.
CPC ............... *C10G 45/08* (2013.01); *C10G 3/46* (2013.01); *C10G 3/50* (2013.01); *C10G 3/62* (2013.01); *C10G 65/04* (2013.01); *Y02E 50/13* (2013.01); *Y02P 30/20* (2015.11)

(58) Field of Classification Search
CPC ............ C07C 1/00; C10G 65/00; C10G 65/02
USPC ...... 585/240, 242; 208/210, 213, 216 R, 217
See application file for complete search history.

(56) References Cited

U.S. PATENT DOCUMENTS

| | | |
|---|---|---|
| 2011/0068047 A1 | 3/2011 | Gudde et al. |
| 2011/0132803 A1 | 6/2011 | Umansky et al. |
| 2011/0259793 A1 | 10/2011 | Umansky et al. |

OTHER PUBLICATIONS

PCT Application No. PCT/US2013/073271, Communication from the International Searching Authority, Form PCT/ISA/220, dated Mar. 5, 2014, 4 pages.
PCT Application No. PCT/US2013/073271, Communication from the International Searching Authority, Form PCT/ISA/237, 5 pages.

*Primary Examiner* — Thuan D Dang
(74) *Attorney, Agent, or Firm* — Chad A. Guice; David M. Weisberg

(57) ABSTRACT

Methods are provided herein for co-processing of biocomponent feeds as well processing of mineral feeds in a reaction system at hydrogen partial pressures of about 500 psig (3.4 MPag) or less. The methods include using stacked beds of both CoMo and NiMo catalysts. The stacked catalyst beds provided unexpectedly high catalyst activity as the input feed to a reaction system was switched between a mineral feed and a feed containing both mineral and biocomponent portions. Additionally, use of stacked catalyst beds can allow for maintenance of the activity for the catalyst system in a reaction system while still achieving a desired activity for both types of feeds.

14 Claims, 3 Drawing Sheets

COMO AND NIMO CATALYST STACKING FOR RENEWABLE DIESEL

CROSS-REFERENCE TO RELATED APPLICATIONS

This application claims priority to U.S. Provisional Application Ser. No. 61/740,497 filed Dec. 21, 2012, which is herein incorporated by reference in its entirety.

FIELD

This invention relates to methods for co-processing of mineral feeds with feeds derived from biological sources.

BACKGROUND

Regulations related to renewable fuels provide an example of how product requirements can change over time. During the next decade, the United States, Canada, and the European Union have increased and/or are likely to increase the required amount of product from renewable sources that is contained in transportation fuels. Based on such regulatory requirements, fuels from vegetable, animal, or algae sources such as "biodiesel" will become increasingly important as a refinery product. As a result, methods are needed that will allow existing refinery equipment to produce suitable transportation fuels that incorporate increasing amounts of renewable components.

Unfortunately, the differences in chemical composition between renewable carbon sources and mineral sources poses some difficulties for refinery processing. For example, typical biologically-derived sources for fuels have oxygen contents of 1 wt % or more, and possibly as much as 10 to 12 wt % or more. Conventional hydroprocessing methods can remove oxygen from a feedstock, but the by-products from deoxygenation can lead to catalyst poisoning and/or contaminant build-up in a reaction system.

SUMMARY OF PREFERRED EMBODIMENTS OF THE INVENTION

In one aspect, a method is provided for hydroprocessing sulfur-containing feeds. The method includes exposing a first feedstock comprising a first mineral fraction and a bio-derived fraction to a first supported catalyst comprising a first Group VI metal and a Group VIII metal selected from Co or Ni under first effective hydrodesulfurization conditions, the first effective hydrodesulfurization conditions including a hydrogen partial pressure of about 500 psig (3.4 MPag) or less, to form a first effluent, the first feedstock comprising at least about 0.5 wt % of oxygen, at least about 800 wppm of sulfur, and 35 wt % or less of the bio-derived fraction; exposing the first effluent to a second supported catalyst comprising a second Group VI metal and a Group VIII metal selected from Co or Ni, in the presence of hydrogen under the first effective hydrodesulfurization conditions to form a first desulfurized product having a sulfur content of about 200 wppm or less, the selected Group VIII metal in the second catalyst being different from the selected Group VIII metal in the first catalyst; exposing a second feedstock comprising a second mineral fraction to at least a portion of the first supported catalyst in the presence of hydrogen under second effective hydrodesulfurization conditions to form a second effluent, the second effective hydrodesulfurization conditions including a hydrogen partial pressure of about 500 psig (3.4 MPag) or less, the second feedstock containing less than about 0.5 wt % of a bio-derived fraction and having a sulfur content of at least about 800 wppm, the at least a portion of the first supported catalyst comprising at least about 80 vol % of the first supported catalyst that was exposed to the first feedstock; and exposing the second effluent to at least a portion of the second supported catalyst in the presence of hydrogen under the second effective hydrodesulfurization conditions for forming a second desulfurized product having a sulfur content of about 200 wppm or less, the at least a portion of the second supported catalyst comprising at least about 80 vol % of the second supported catalyst that was exposed to the first feedstock.

In another aspect, a method is provided for hydroprocessing sulfur-containing feeds. The method includes exposing a second feedstock comprising a second mineral fraction to a first supported catalyst comprising a Group VI metal and a Group VIII metal selected from Co or Ni in the presence of hydrogen under first effective hydrodesulfurization conditions to form a first effluent, the second feedstock containing less than about 0.5 wt % of a bio-derived fraction and at least about 800 wppm of sulfur, at least about 80 vol % of the first supported catalyst having been previously exposed to a first feedstock under first effective hydrodesulfurization conditions, the first feedstock comprising a first mineral fraction and a first bio-derived fraction and having an oxygen content of at least about 1.0 wt %, the first effective hydrodesulfurization conditions including a partial pressure of hydrogen of about 400 psig or less; exposing the first effluent to a second supported catalyst comprising a Group VI metal and a Group VIII metal selected from Co or Ni, in the presence of hydrogen under the second effective hydrodesulfurization conditions to form a first desulfurized product having a sulfur content of about 200 wppm or less, the selected Group VIII metal in the second catalyst being different from the selected Group VIII metal in the first catalyst, at least about 80 vol % of the second supported catalyst having been previously exposed to the first feedstock under the first effective hydrodesulfurization conditions; exposing a third feedstock comprising a third mineral fraction and a third bio-derived fraction to at least a portion of the first supported catalyst in the presence of hydrogen under third effective hydrodesulfurization conditions to form a second effluent, the third feedstock having an oxygen content of at least about 0.5 wt %, a sulfur content of at least about 800 wppm, and containing about 35 wt % or less of the second bio-derived fraction, the at least a portion of the first supported catalyst corresponding to at least about 80 vol % of the first supported catalyst that was exposed to the second feedstock; and exposing the second effluent to at least a portion of the second supported catalyst in the presence of hydrogen under the effective hydrodesulfurization conditions for forming a second desulfurized product having a sulfur content of about 200 wppm or less, the at least a portion of the second supported catalyst corresponding to at least about 80 vol % of the second supported catalyst that was exposed to the second feedstock.

DETAILED DESCRIPTION OF THE PREFERRED EMBODIMENTS

Overview

Figure 1:
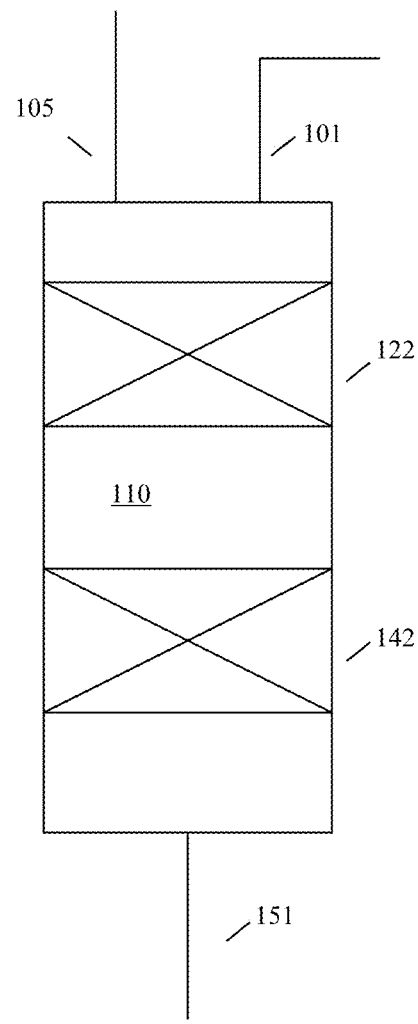
FIG. 1 depicts a reaction system suitable for performing a process according to the invention.

In various aspects, methods are provided for co-processing of biocomponent feeds as well processing of mineral feeds in a reaction system at hydrogen partial pressures of about 500 psig (3.4 MPag) or less. The methods include using stacked beds of both CoMo and NiMo catalysts. The stacked catalyst beds provided unexpectedly high catalyst activity as the input feed to a reaction system was switched between a mineral feed and a feed containing both mineral and biocomponent portions. Additionally, use of stacked catalyst beds can allow for maintenance of the activity for the catalyst system in a reaction system while still achieving a desired activity for both types of feeds.

In many locations, regulatory requirements are slowly increasing the amount of renewable feedstock that must be processed in a refinery for incorporation into fuel products, such as a renewable diesel. However, such regulations do not always require production of renewable fuels on a year-round basis. For example, a regulation may require production of a limited amount of a renewable fuel product for 6 months out of the year.

The slow increase in the regulatory requirements for generating renewable diesel or other fuels can pose difficulties for existing refineries. Many refineries include hydroprocessing reactors in order to reduce the sulfur content of a feedstock to a desired level. Exposing a renewable feedstock to the conditions in a hydroprocessing reactor can remove oxygen from a renewable feedstock, but typically this also results in a loss of desulfurization activity. Prior to hydroprocessing, many renewable feedstocks have oxygen contents of 5 wt % or greater. At least a portion of this oxygen results in formation of CO and/or $CO_2$ during hydroprocessing, which can inhibit the desulfurization activity of a hydroprocessing catalyst.

One option for meeting the renewable fuel requirements would be to always perform co-processing of renewable and mineral feeds, so that a reaction system can be used to process a relatively consistent slate of feeds. By selecting a feed slate sufficient to satisfy the peak regulatory requirement for renewable fuels, no adjustment would need to be made to the reaction conditions. However, co-processing of a renewable feed and a mineral feed is generally less favorable than processing only a similar mineral feed for a variety of reasons. Hydrogen consumption for renewable feeds tends to be higher than for mineral feeds. Renewable feeds are also currently more expensive than a mineral feed that provides a comparable fuel product, and a constant supply of suitable renewable feedstocks is not always available. Additionally, more severe processing conditions are typically required during co-processing, in order to compensate for reduced catalyst activity noted above when processing a renewable feed that contains oxygen.

Another option is to build a separate process train to handle production of the required amounts of renewable diesel. While this can be effective, building a separate process train requires substantial capital investment.

Processing of Mineral and Renewable Feeds in Single Reaction System

Instead of processing a single type of feed slate, a more desirable option could be to co-process renewable feed with mineral feed at certain times in order to meet the regulatory standard, and then process only mineral feed at other times. This can lead to a variety of additional considerations related to catalyst choice and the operating pressure for the hydroprocessing reactor or reaction system.

One consideration is related to the type of hydrotreating catalyst used for the hydroprocessing reactor. Hydrotreating catalysts including either CoMo or NiMo as the active metals are common selections for hydroprocessing of mineral feeds for sulfur removal. NiMo catalysts generally have a higher desulfurization activity than CoMo catalysts at hydrogen partial pressures of about 500 psig (3.4 MPag) or greater. However, at partial hydrogen pressures of about 500 psig (3.4 MPag) or less, CoMo catalysts provide greater desulfurization activity. Performing desulfurization at lower hydrogen partial pressures may require lower space velocities, but overall hydrogen consumption can be reduced.

Based on the above, the choice of hydrotreatment catalyst for a desulfurization stage can be based on the desired operating pressure for a reactor. If greater reactivity is desired, a reactor can include NiMo catalyst in combination with a higher hydrogen pressure in the reaction environment. For reduced consumption of hydrogen, a lower pressure can be used in combination with a CoMo catalyst.

Figure 2:
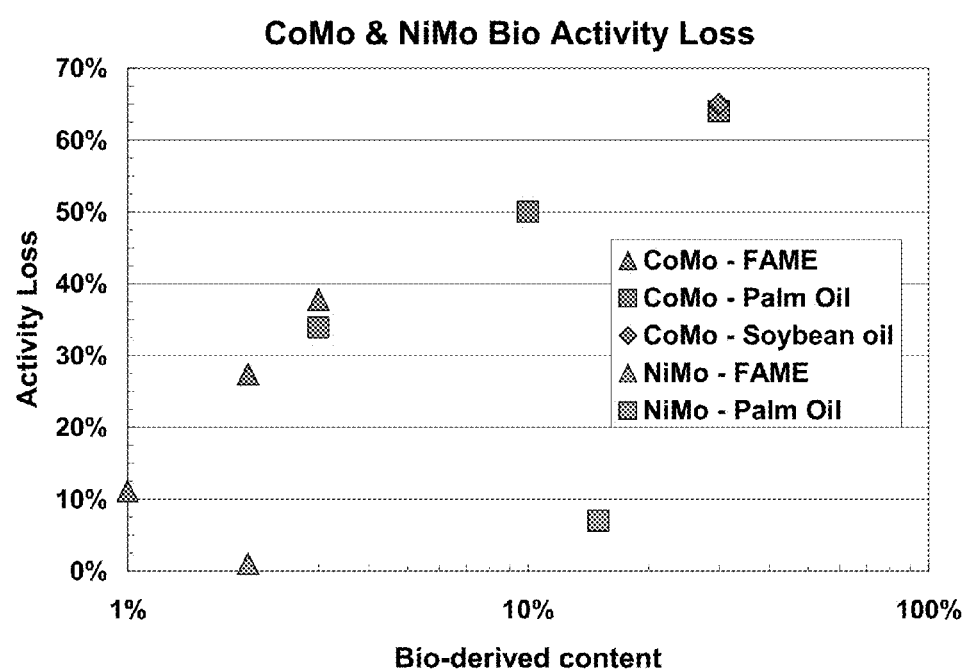
FIG. 2 shows activity data for various catalysts during co-processing of a mineral feed and a bio-derived feed.

Addition of an oxygen-containing (renewable) feed to a reactor changes the relative efficiencies of the catalysts. FIG. 2 shows the change in desulfurization activity for CoMo catalysts and NiMo catalysts when processing feeds containing varying amounts of renewable feed. In FIG. 2, the amount of hydrodesulfurization activity loss is shown for both CoMo and NiMo catalysts for feeds containing various amounts of a renewable (biocomponent) feedstock. It is noted that the amount of renewable feed shown on the horizontal axis is shown in log scale.

In FIG. 2, the data points corresponding to the NiMo catalyst represent hydrodesulfurization at about 800 psig (5.5 MPag) of $H_2$, while the data points for the CoMo catalyst represent hydrodesulfurization at about 365 psig (2.5 MPag) of $H_2$. The amount of activity loss during co-processing of a mineral feed with a bio-derived feed is 10% or less, even for a feedstock containing 10% or more of a bio-derived feed. By contrast, during co-processing of a mineral feed with a bio-derived feed, a CoMo desulfurization catalyst has a more substantial loss of hydrodesulfurization activity, ranging from about a 10% activity loss for feeds with a low content (about 1%) of bio-derived feed to about a 70% activity loss for a feed containing about 15% of a bio-derived feed.

Based on a conventional understanding of the relative processing activity of CoMo and NiMo catalysts, in combination with the data shown in FIG. 2, it would be expected that NiMo catalysts would be preferred for co-processing of mineral and renewable feeds under almost any processing conditions. This is due in part to the severe loss in hydrodesulfurization activity for CoMo catalysts in the presence of a bio-derived feed. However, it has unexpectedly been discovered that stacked beds of CoMo and NiMo catalysts can provide improved performance relative to a catalyst system using just NiMo catalyst under various conditions. In particular, improved performance can be achieved during desulfurization of a mineral feed using a catalyst system that has already been used to co-process a feed including both mineral and bio-derived portions.

In various embodiments, a catalyst system comprising a stacked bed of hydrotreatment catalysts is used to consecutively hydroprocess a mineral feed followed by a feed including a mixture of mineral and bio-derived portions. The stacked bed of hydrotreatment catalysts corresponds to a stacked bed that has previously been used for hydrotreatment of a feed containing both a mineral portion and bio-derived portion. The prior feed corresponds to a feed with an oxygen content of at least about 0.5 wt %, such as at least about 1.0 wt %. Preferably, the catalysts are previously exposed to the feed containing a bio-derived portion and/or having an oxygen content of at least about 0.5 wt % under lower pressure desulfurization conditions, such as about 500 psig (3.4 MPag) of $H_2$ or less, preferably 400 psig (2.8 MPag) of $H_2$ or less. A first catalyst in the stacked bed is a catalyst containing Co as a Group VIII metal, while a second catalyst contains Ni as a Group VIII metal. The previously exposed catalysts can be arranged in a stacked bed, so the feed contacts the catalysts consecutively. The current feed is exposed to the catalysts under effective conditions for desulfurizing the feed to a desired level, such as reducing the sulfur level to 100 wppm or less, or 50 wppm or less, or 25 wppm or less, or 15 wppm or less, or 10 wppm or less.

In some embodiments, a portion of a stacked bed catalyst system can be exchanged when a feed is changed. Thus, at least about 90 wt % of the catalyst in the catalyst system can correspond to catalyst previously used for hydrotreatment of a feed comprising mineral and bio-derived portions, such as at least 95 wt %. Additionally or alternately, at least about 80 wt % of the Co-containing catalyst and at least about 80 wt % of the Ni-containing catalyst can comprise previously used catalyst, such as at least 90 wt % of one or both of the Co- and Ni-containing catalysts.

Preferably, when switching from a feed containing both a mineral and bio-derived portion to a feed with only a mineral portion (or vice versa), the amount of change in the processing conditions can be limited. For example, the space velocity of a reactor may be changed in order to achieve a desired sulfur target. However, for the reaction temperature and/or the hydrogen partial pressure, changes in the condition when a feed changes can be limited to about 20% or less of the value prior to switching feeds, such as 10% or less. This reflects the desire at many refineries to operate reactor units within a relatively narrow range of conditions.

Feedstocks

In the discussion below, a biocomponent (or bio-derived) feed or feedstock refers to a hydrocarbon feedstock derived from a biological raw material component, such as vegetable fats/oils or animal fats/oils, fish oils, pyrolysis oils, and algae lipids/oils, as well as components of such materials, and in some embodiments can specifically include one or more types of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Algae oils or lipids can typically be contained in algae in the form of membrane components, storage products, and/or metabolites. Certain algal strains, particularly microalgae such as diatoms and cyanobacteria, can contain proportionally high levels of lipids. Algal sources for the algae oils can contain varying amounts, e.g., from 2 wt % to 40 wt % of lipids, based on total weight of the biomass itself.

Algal sources for algae oils can include, but are not limited to, unicellular and multicellular algae. Examples of such algae can include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis camerae, Prymnesium parvum, Tetraselmis chui*, and *Chlamydomonas reinhardtii*. Additional or alternate algal sources can include one or more microalgae of the *Achnanthes, Amphiprora, Amphora, Ankistrodesmus, Asteromonas, Boekelovia, Borodinella, Botryococcus, Bracteococcus, Chaetoceros, Carteria, Chlamydomonas, Chlorococcum, Chlorogonium, Chlorella, Chroomonas, Chrysosphaera, Cricosphaera, Crypthecodinium, Cryptomonas, Cyclotella, Dunaliella, Ellipsoidon, Emiliania, Eremosphaera, Ernodesmius, Euglena, Franceia, Fragilaria, Gloeothamnion, Haematococcus, Halocafeteria, Hymenomonas, Isochrysis, Lepocinclis, Micractinium, Monoraphidium, Nannochloris, Nannochloropsis, Navicula, Neochloris, Nephrochloris, Nephroselmis, Nitzschia, Ochromonas, Oedogonium, Oocystis, Ostreococcus, Pavlova, Parachlorella, Pascheria, Phaeodactylum, Phagus, Platymonas, Pleurochrysis, Pleurococcus, Prototheca, Pseudochlorella, Pyramimonas, Pyrobotrys, Scenedesmus, Skeletonema, Spyrogyra, Stichococcus, Tetraselmis, Thalassiosira, Viridiella*, and *Volvox* species, and/or one or more cyanobacteria of the *Agmenellum, Anabaena, Anabaenopsis, Anacystis, Aphanizomenon, Arthrospira, Asterocapsa, Borzia, Calothrix, Chamaesiphon, Chlorogloeopsis, Chroococcidiopsis, Chroococcus, Crinalium, Cyanobacterium, Cyanobium, Cyanocystis, Cyanospira, Cyanothece, Cylindrospermopsis, Cylindrospermum, Dactylococcopsis, Dermocarpella, Fischerella, Fremyella, Geitleria, Geitlerinema, Gloeobacter, Gloeocapsa, Gloeothece, Halospirulina, Iyengariella, Leptolyngbya, Limnothrix, Lyngbya, Microcoleus, Microcystis, Myxosarcina, Nodularia, Nostoc, Nostochopsis, Oscillatoria, Phormidium, Planktothrix, Pleurocapsa, Prochlorococ-* cus, Prochloron, Prochlorothrix, Pseudanabaena, Rivularia, Schizothrix, Scytonema, Spirulina, Stanieria, Starria, Stigonema, Symploca, Synechococcus, Synechocystis, Tolypothrix, Trichodesmium, Tychonema, and Xenococcus species.

Other biocomponent feeds usable in the present invention can include any of those which comprise primarily triglycerides and free fatty acids (FFAs). The triglycerides and FFAs typically contain aliphatic hydrocarbon chains in their structure having from 8 to 36 carbons, preferably from 10 to 26 carbons, for example from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can be comprised of $C_{10}$ to $C_{26}$ fatty acid constituents, based on total triglyceride present in the lipid material. Further, a triglyceride is a molecule having a structure identical to the reaction product of glycerol and three fatty acids. Thus, although a triglyceride is described herein as being comprised of fatty acids, it should be understood that the fatty acid component does not necessarily contain a carboxylic acid hydrogen. If triglycerides are present, a majority of triglycerides present in the biocomponent feed can preferably be comprised of $C_{12}$ to $C_{18}$ fatty acid constituents, based on total triglyceride content. Other types of feed that are derived from biological raw material components can include fatty acid esters, such as fatty acid alkyl esters (e.g., FAME and/or FAEE).

Typically, the feed can include at least 0.1 wt % of feed based on a biocomponent source, or at least 0.5 wt %, or at least 1 wt %, or at least 3 wt %, or at least 10 wt %, or at least 15 wt %. Additionally or alternately, the feed can include 35 wt % or less of a feed based on a biocomponent source, or 25 wt % or less, or 15 wt % or less. Optionally, the feedstock can include at least about 1% by weight of glycerides, lipids, fatty acids, fatty acid esters (such as fatty acid alkyl esters), or a combination thereof. The gylcerides can include monoglycerides, diglycerides, or triglycerides. For example, the feedstock can include at least about 5 wt %, or at least about 10 wt %, or at least 20 wt % of glycerides, lipids, fatty acids, fatty acid esters, fatty acid alkyl esters, or a combination thereof. If the feedstock contains glycerides, lipids, or fatty acid compounds, the feedstock can include about 35 wt % or less, or about 25 wt % or less, or about 15 wt % or less, or about 10 wt % or less of glycerides, lipids, fatty acids, fatty acid esters, fatty acid alkyl esters, or a combination thereof. For example, the feedstock can include glycerides and/or fatty acid esters. Preferably, the feedstock can include triglycerides, fatty acid methyl esters, or a combination thereof.

In an embodiment, the biocomponent portion of the feedstock (such as the glycerides and/or fatty acid esters) can be a non-hydrotreated portion. A non-hydrotreated feed can typically have an olefin content and an oxygen content similar to the content of the corresponding raw biocomponent material. Examples of suitable biocomponent feeds can include food grade vegetable oils, and biocomponent feeds that are refined, bleached, and/or deodorized.

Biocomponent based diesel boiling range feedstreams can have a wide range of nitrogen and/or sulfur contents. For example, a biocomponent based feedstream based on a vegetable oil source can contain up to about 300 wppm nitrogen. In contrast, a biomass based feedstream containing whole or ruptured algae can sometimes include a higher nitrogen content. Depending on the type of algae, the nitrogen content of an algae based feedstream can be at least about 2 wt %, for example at least about 3 wt %, at least about 5 wt %, or at least about 10 wt %, and algae with still higher nitrogen contents are known. The sulfur content of a biocomponent feed can also vary. In some embodiments, the sulfur content can be about 500 wppm or less, for example about 100 wppm or less, about 50 wppm or less, or about 10 wppm or less.

Aside from nitrogen and sulfur, oxygen can be another heteroatom component in biocomponent based feeds. A biocomponent diesel boiling range feedstream based on a vegetable oil, prior to hydrotreatment, can include up to about 10 wt % oxygen, for example up to about 12 wt % or up to about 14 wt %. Additionally or alternately, such a biocomponent diesel boiling range feedstream can include at least about 1 wt % oxygen, for example at least about 2 wt %, at least about 3 wt %, at least about 4 wt %, at least about 5 wt %, at least about 6 wt %, or at least about 8 wt %. Further additionally or alternately, a biocomponent feedstream, prior to hydrotreatment, can include an olefin content of at least about 3 wt %, for example at least about 5 wt % or at least about 10 wt %.

A mineral feedstock refers to a conventional (e.g., non-biocomponent) feedstock, typically derived from crude oil and that has optionally been subjected to one or more separation and/or other refining processes. In one preferred embodiment, the mineral feedstock can be a petroleum feedstock boiling in the diesel range or above. Examples of suitable feedstocks can include, but are not limited to, virgin distillates, hydrotreated virgin distillates, kerosene, diesel boiling range feeds (such as hydrotreated diesel boiling range feeds), light cycle oils, atmospheric gasoils, and the like, and combinations thereof.

Mineral feedstocks for blending with a biocomponent feedstock can have a nitrogen content from about 50 wppm to about 2000 wppm nitrogen, for example from about 50 wppm to about 1500 wppm or from about 75 to about 1000 wppm. In some embodiments, the mineral feedstock can have a sulfur content from about 100 wppm to about 10,000 wppm sulfur, for example from about 200 wppm to about 5,000 wppm or from about 350 wppm to about 2,500 wppm. Additionally or alternately, the combined (biocomponent plus mineral) feedstock can have a sulfur content of at least about 500 wppm, such as at least about 1000 wppm or at least about 2500 wppm. In yet another embodiment, the combined feedstock can have a sulfur content of about 10,000 wppm or less, or about 2000 wppm or less, or about 1000 wppm or less. Still further additionally or alternately, the nitrogen content of the combined feedstock can be about 1000 wppm or less, for example about 500 wppm or less, about 100 wppm or less, about 50 wppm or less, about 30 wppm or less, about 20 wppm or less, or about 10 wppm or less.

The content of sulfur, nitrogen, oxygen, and olefins in a feedstock created by blending two or more feedstocks can typically be determined using a weighted average based on the blended feeds. For example, a mineral feed and a biocomponent feed can be blended in a ratio of 80 wt % mineral feed and 20 wt % biocomponent feed. If the mineral feed has a sulfur content of about 1000 wppm, and the biocomponent feed has a sulfur content of about 10 wppm, the resulting blended feed could be expected to have a sulfur content of about 802 wppm.

Diesel boiling range feedstreams suitable for use in the present invention tend to boil within the range of about 215° F. (about 102° C.) to about 800° F. (about 427° C.). Preferably, the diesel boiling range feedstream has an initial boiling point of at least about 215° F. (about 102° C.), for example at least about 250° F. (about 121° C.), at least about 275° F. (about 135° C.), at least about 300° F. (about 149° C.), at least about 325° F. (about 163° C.), at least about 350° F. (about 177° C.), at least about 400° F. (about 204° C.), or at least about 451° F. (about 233° C.). Preferably, the diesel boiling range feedstream has a final boiling point of about 800° F. (about 427° C.) or less, or about 775° F. (about 413° C.) or less, or about 750° F. (about 399° C.) or less. In some embodiments, the diesel boiling range feedstream can have a boiling range from about 451° F. (about 233° C.) to about 800° C. (about 427° C.). Additionally or alternately, the feedstock can be characterized by the boiling point required to boil a specified percentage of the feed. For example, the temperature required to boil at least 5 wt % of a feed is referred to as a "T5" boiling point. A suitable mineral (petroleum) feedstock can have a T5 boiling point of at least about 230° F. (about 110° C.), for example at least about 250° F. (about 121° C.) or at least about 275° F. (about 135° C.). Further additionally or alternately, the mineral (petroleum) feedstock can have a T95 boiling point of about 775° F. (about 418° C.) or less, for example about 750° F. (about 399° C.) or less or about 725° F. (about 385° C.) or less. In another embodiment, the diesel boiling range feedstream can also include kerosene range compounds to provide a feedstream with a boiling range from about 250° F. (about 121° C.) to about 800° F. (about 427° C.).

Hydroprocessing Conditions—Hydrotreatment

A mixture of mineral and biocomponent feed can be hydrotreated in one or more reaction stages. A reaction stage can correspond to one or more catalyst beds. The catalyst beds can include at least one bed or portion of a bed that corresponds to a CoMo catalyst, and at least one bed or portion of a bed that corresponds to a NiMo catalyst. This results in a stacked bed arrangement of catalyst. It is noted that a stacked bed of catalysts is defined herein to include situations where the catalysts are stacked in different beds as well as where both catalysts are present in a single physical bed. Optionally but preferably, both catalysts in a stacked catalyst bed can be included in a single stage, such as in a single reactor.

Reaction conditions in a hydrotreatment stage can be effective conditions suitable for reducing the sulfur content of the feedstream. The reaction conditions can include an LHSV of 0.3 to 5.0 hr$^{-1}$, a hydrogen partial pressure from about 200 psig (1.4 MPa) to about 500 psig (3.4 MPag), a treat gas containing at least about 80% hydrogen (remainder inert gas) with a hydrogen treat gas rate of about 500 scf/bbl (84 m$^3$/m$^3$) to about 10000 scf/bbl (1685 m$^3$/m$^3$), and a temperature of from about 500° F. (260° C.) to about 800° F. (427° C.). Preferably, the reaction conditions include an LHSV of from about 0.5 to about 1.5 hr$^{-1}$, a total pressure from about 300 psig (2.1 MPag) to about 400 psig (2.8 MPag), and a temperature of from about 700° F. (371° C.) to about 750° F. (399° C.).

The conditions in the hydrotreatment stage can depend on whether the stage is operated as a low pressure stage or an intermediate/high pressure stage. For a low pressure stage, the hydrogen partial pressure in the stage can be from about 200 psig (1.4 MPag) to about 500 psig (3.4 MPag). For example, the hydrogen partial pressure can be at least about 200 psig (1.4 MPag), or at least about 300 psig (2.1 MPag). Additionally or alternately, the pressure can be about 500 psig (3.4 MPag) or less, or about 450 psig (3.1 MPag) or less, or about 400 psig (2.8 MPag) or less, or about 350 psig (2.4 MPag) or less. More generally, the pressure in a stage in the hydrotreatment reactor can be at least about 200 psig (1.4 MPag), or at least about 250 psig (1.8 MPag), or at least about 300 psig (2.1 MPag), or at least about 350 psig (2.4 MPag). The pressure in a stage in the hydrotreatment reactor can be about 500 psig (3.4 MPag) or less, or about 450 psig (3.1 MPag) or less, or about 400 psig (2.8 MPag) or less.

The catalyst system used in a hydrotreatment stage can include two or more hydrotreating catalysts in a stacked bed. The catalysts can include a Group VI metal (corresponding to Column 6 of the modern IUPAC Periodic Table of Elements) and a Group VIII metal (corresponding to Columns 8-10 of the modern IUPAC Periodic Table of Elements) on a support. A first catalyst in the stacked bed can include either Co or Ni as the Group VIII metal. A second catalyst in the stacked bed can include the other metal from Co or Ni that is not used in the first catalyst. The Group VI metal can be Mo (preferred) or Ni. Suitable total amounts of metals range from about 1 wt % to about 35 wt % relative to the total weight of the catalyst. The term "Group VI" as utilized herein corresponds to Column 6 of the modern IUPAC Periodic Table of Elements, where the term "Group VIII" as utilized herein corresponds to Columns 8-10 of the modern IUPAC Periodic Table of Elements.

The hydrotreating conditions can be selected to reduce the sulfur and/or the nitrogen content of the feed to a desired level. One option is to hydrotreat the feed under conditions effective to reduce the sulfur to less than about 100 wppm, or less than about 50 wppm, or less than about 15 wppm, or less than about 10 wppm. The amount of sulfur remaining can be dependent on the desired standard for the country of use. The amount of nitrogen can similarly be reduced to about 15 wppm or less, or about 10 wppm or less, or about 1 wppm or less.

Hydrotreatment can also be used to deoxygenate a biocomponent feed or other oxygen containing feed. Deoxygenating a feed can avoid problems with catalyst poisoning or deactivation due to the creation of water or carbon oxides during hydroprocessing. The hydrotreating process can be used to substantially deoxygenate a feedstock. This corresponds to removing at least 90%, or at least 95%, or at least 98%, or at least 99% of the oxygen present in the biocomponent feedstock. Alternatively, substantially deoxygenating the feedstock can correspond to reducing the oxygenate level of the total feedstock to 0.1 wt % or less, or 0.05 wt % or less, or 0.01 wt % or less, or 0.005 wt % or less.

Example of Processing Configuration

FIG. 1 schematically shows an example of a processing configuration suitable for use according to the invention. In FIG. 1, a reactor 110 is shown that includes two catalyst beds. A first catalyst bed 122 corresponds to a first supported catalyst having both a Group VI and a Group VIII metal, with Ni or Co as the Group VIII metal. The second catalyst bed 142 corresponds to a hydrotreatment catalyst incorporating the other metal from Ni or Co. A mixture 105 of a biocomponent/bio-derived feed and a sulfur-containing mineral feed can be introduced into the reactor 110 along with a hydrogen-containing stream 101. The mixture can be hydrotreated under effective conditions for desulfurization, which will also result in deoxygenation of the feed. The configuration in FIG. 1 shows only one bed of each type of catalyst, but additional beds of one or both catalysts can also be used. The resulting desulfurized (and deoxygenated) effluent 151 can be used in any convenient manner, such as by adding the effluent to the diesel pool or subjecting the effluent to further processing. As an alternative, a configuration similar to FIG. 1 can be constructed by placing first catalyst bed 122 and second catalyst bed 142 in separate reactors and cascading the effluent from first catalyst bed 122 into the reactor containing second catalyst bed 142.

Example of Consecutive Desulfurization of Mineral and Bio-Derived/Mineral Feeds

A series of catalysts and conditions were tested to determine catalyst activity for a commercially available CoMo hydrotreating catalyst, a commercially available NiMo hydrotreating catalyst, and stacked bed configurations of the CoMo and NiMo catalysts. The commercially available CoMo catalyst that was investigated contained 2-6 wt % Co and 10-30 wt % Mo. The commercially available NiMo catalyst that was investigated contained 2-6 wt % Ni and 10-30 wt % Mo. Each reaction vessel was loaded with the same total volume of hydrotreating catalyst (CoMo, NiMo, or combination of CoMo and NiMo). Reaction vessels 1 and 2 contained the CoMo catalyst. Reaction vessels 3 and 4 contained the NiMo catalyst. Reaction vessel 5 contained a stacked bed of 50 vol % CoMo followed by 50 vol % NiMo. Reaction vessel 6 contained a stacked bed of 50 vol % NiMo followed by 50 vol % CoMo.

The catalysts were then used for hydroprocessing series of feeds under reaction conditions shown in Table 1. Condition 1 represents a baseline run for the catalysts for processing a diesel boiling range feed with a sulfur content of at least 1000 wppm at a higher pressure condition (800 psig of $H_2$). This condition was performed before the catalyst systems were exposed to a feed that includes a bio-derived portion. Condition 2 represents processing a feed including a bio-derived portion at the high pressure condition. The feed was formed by adding 15 wt % soybean oil to the mineral feed used in condition 1. Soybean oil can have an oxygen content of about 10 wt %, so the total oxygen in the mineral feed containing 15 wt % soybean oil is (at least) about 1.5 wt %. Condition 3 represents processing the feed including the bio-derived portion at a lower pressure condition (365 psig of $H_2$). Condition 4 represents processing only the mineral feed at the lower pressure condition. At this point, the catalyst systems have been exposed to the mixed feed containing mineral and bio-derived portions. Condition 5 is a repeat of condition 1, with the exception that the catalysts have been exposed to the feed containing both mineral and bio-derived portions.

TABLE 1

Conditions for Mineral and Mineral/Renewable Desulfurization

| | Condition 1 | Condition 2 | Condition 3 | Condition 4 | Condition 5 |
|---|---|---|---|---|---|
| Bio Content | No | 15% Soy | 15% Soy | No | No |
| Temp (° F./° C.) | 630° F. | 630° F. | 655° F. | 655° F. | 630° F. |
| H$_2$ Pressure (psig) | 800 | 800 | 365 | 365 | 800 |
| LHSV (hr$^{-1}$) | 1.25 | 1.25 | 0.8 | 0.8 | 1.25 |
| Treat Gas Rate (scf/bbl) | 1800 | 1800 | 736 | 736 | 1800 |

Figure 3:
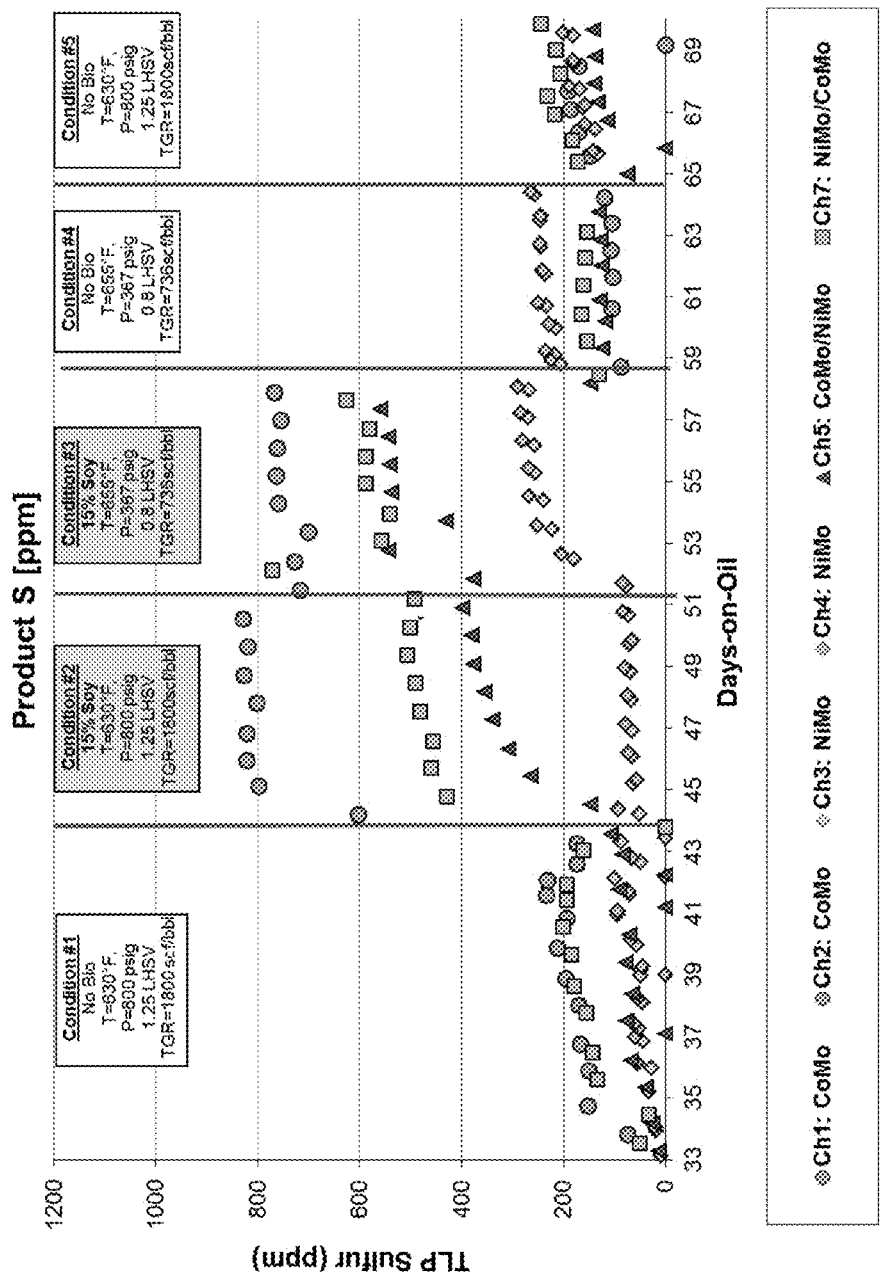
FIG. 3 shows results from desulfurization of feeds with various catalyst systems.

FIG. 3 shows the results from processing at Conditions 1-5 using the catalysts in reaction vessels 1-6. The results for condition 1 show the generally superior reactivity of processing at medium or higher pressures using a NiMo hydrotreating catalyst. The stacked bed of CoMo followed by NiMo also reduces the sulfur content to less than 100 wppm. The CoMo only and NiMo follow by CoMo reaction vessels reduced the sulfur content to below 200 wppm, but clearly showed less desulfurization activity.

At Condition 2, the processing conditions are the same, but the feed is changed to include 15% soybean oil, which increases the oxygen content of the feed to (at least) about 1.5%. The order of reactivity is similar, with the NiMo catalyst having the highest desulfurization activity, and the CoMo/NiMo stacked bed providing the next highest desulfurization activity. The same pattern of activity is also observed at Condition 3, where the feed containing 15% soybean oil is processed under different reaction conditions, including the lower $H_2$ pressure of 365 psig.

At Condition 4, the feed is returned to being just a mineral feed at the reaction conditions used in Condition 3. The order of activity is now reversed, with the CoMo and CoMo/NiMo stacked bed vessels providing the best desulfurization activity. The NiMo/CoMo stacked bed is also superior to the NiMo catalyst for desulfurization activity.

Condition 5 uses the same conditions as Condition 1. However, due to the intermediate exposure to the feed containing soybean oil, the activity of the catalysts is different. In Condition 5, the catalyst stack of CoMo followed by NiMo provides the best desulfurization activity. The remaining catalyst systems all exhibit similar activity.

Based on the results from Conditions 1-5 (as shown in FIG. 3), it is clear that the exposure to the feed containing a bio-derived portion, and in particular the exposure to a feed containing a bio-derived portion at a pressure below 400 psig (2.8 MPag), resulted in a change in the desulfurization activity for the various catalysts or catalyst systems when the reactions systems were returned to processing of mineral feeds. The data in FIG. 3 shows a variety of unexpected results.

One unexpected result is that after exposure to the feed including a bio-derived portion, the stacked bed of CoMo followed by NiMo provided the best desulfurization activity even at a higher pressure of 800 psig (5.5 MPag). As shown in Condition 1, a NiMo catalyst typically provides clearly superior reactivity to a CoMo catalyst for desulfurization at medium pressures. However, at Condition 5, the reactivities of the systems are similar. By itself this would be surprising, but it is even more surprising in view of the fact that a stacked bed of CoMo followed by NiMo provides still better desulfurization activity at Condition 5. A possible explanation based only on the comparison of the CoMo, NiMo, and CoMo/NiMo stacked beds would be that the CoMo catalyst in the stacked bed of CoMo/NiMo performs nearly all of the deoxygenation of the bio-derived portion of a feed. By performing the deoxygenation of the bio-derived portion, the CoMo catalyst in the stacked bed may somehow be acting as a guard bed.

The above explanation, however, does not then explain another unexpected result within the data in FIG. 3. As shown in FIG. 3, the stacked bed of NiMo followed by CoMo shows little or no deactivation due to the exposure to the feed containing a bio-derived portion. This is in contrast to the reaction vessels with only NiMo catalyst, which showed substantial deactivation. The desulfurization activity of the NiMo/CoMo catalyst stack is generally lower than the desulfurization activity for the CoMo/NiMo stack. However, the potential explanation for why the CoMo/NiMo stack does not show deactivation after removal of the bio-derived portion of the feed cannot apply to the NiMo/CoMo stack. Since the NiMo portion of the NiMo/CoMo stack would be exposed to the feed first, it is not as clear why the NiMo/CoMo stack does not show greater deactivation.

ADDITIONAL EMBODIMENTS

Embodiment 1

A method for hydroprocessing sulfur-containing feeds, comprising: exposing a first feedstock comprising a first mineral fraction and a bio-derived fraction to a first supported catalyst comprising a first Group VI metal and a Group VIII metal selected from Co or Ni under first effective hydrodesulfurization conditions, the first effective hydrodesulfurization conditions including a hydrogen partial pressure of about 500 psig (3.4 MPag) or less, to form a first effluent, the first feedstock comprising at least about 0.5 wt % of oxygen, at least about 800 wppm of sulfur, and 35 wt % or less of the bio-derived fraction; exposing the first effluent to a second supported catalyst comprising a second Group VI metal and a Group VIII metal selected from Co or Ni, in the presence of hydrogen under the first effective hydrodesulfurization conditions to form a first desulfurized product having a sulfur content of about 200 wppm or less, the selected Group VIII metal in the second catalyst being different from the selected Group VIII metal in the first catalyst; exposing a second feedstock comprising a second mineral fraction to at least a portion of the first supported catalyst in the presence of hydrogen under second effective hydrodesulfurization conditions to form a second effluent, the second effective hydrodesulfurization conditions including a hydrogen partial pressure of about 500 psig (3.4 MPag) or less, the second feedstock containing less than about 0.5 wt % of a bio-derived fraction and having a sulfur content of at least about 800 wppm, the at least a portion of the first supported catalyst comprising at least about 80 vol % of the first supported catalyst that was exposed to the first feedstock; and exposing the second effluent to at least a portion of the second supported catalyst in the presence of hydrogen under the second effective hydrodesulfurization conditions for forming a second desulfurized product having a sulfur content of about 200 wppm or less, the at least a portion of the second supported catalyst comprising at least about 80 vol % of the second supported catalyst that was exposed to the first feedstock.

Embodiment 2

The method of Embodiment 1, wherein at least one of the first Group VI metal and the second Group VI metal comprises Mo, W, or a combination thereof.

Embodiment 3

The method of any of the above embodiments, wherein the first effective hydrodesulfurization conditions comprise an LHSV of 0.3 to 5.0 hr$^{-1}$, a hydrogen partial pressure of at least about 200 psig (1.4 MPa), a treat gas containing at least about 80% hydrogen (remainder inert gas) with a hydrogen treat gas rate of about 500 scf/bbl (84 m$^3$/m$^3$) to about 10000 scf/bbl (1685 m$^3$/m$^3$), and a temperature of from about 500° F. (260° C.) to about 800° F. (427° C.), and preferably comprise an LHSV of 0.3 to 5.0 hr$^{-1}$, a hydrogen partial pressure of about 300 psig (2.1 MPag) to about 400 psig (2.8 MPag), a treat gas containing at least about 80% hydrogen (remainder inert gas) with a hydrogen treat gas rate of about 500 scf/bbl (84 m$^3$/m$^3$) to about 10000 scf/bbl (1685 m$^3$/m$^3$), and a temperature of from about 500° F. (260° C.) to about 800° F. (427° C.).

Embodiment 4

The method of any of the above embodiments, wherein the second effective hydrodesulfurization conditions comprise an LHSV of 0.3 to 5.0 hr$^{-1}$, a hydrogen partial pressure of at least about 200 psig (1.4 MPa), a treat gas containing at least about 80% hydrogen (remainder inert gas) with a hydrogen treat gas rate of about 500 scf/bbl (84 m$^3$/m$^3$) to about 10000 scf/bbl (1685 m$^3$/m$^3$), and a temperature of from about 500° F. (260° C.) to about 800° F. (427° C.).

Embodiment 5

The method of Embodiments 3 or 4, wherein the second effective hydrodesulfurization conditions comprise a hydrogen partial pressure that differs from the hydrogen partial pressure of the first effective hydrodesulfurization conditions by about 20% or less.

Embodiment 6

The method of any of Embodiments 3 to 5, wherein the second effective hydrodesulfurization conditions comprise a temperature that differs from a hydrogen temperature of the first effective hydrodesulfurization conditions by about 20% or less.

Embodiment 7

The method of any of the above embodiments, wherein the first supported catalyst comprises Co and the first Group VI metal is Mo.

Embodiment 8

The method of any of the above embodiments, wherein the first supported catalyst and the second supported catalyst form a stacked bed of catalysts.

Embodiment 9

The method of any of the above embodiments, wherein a support for at least one of the first supported catalyst and the second supported catalyst comprises alumina, silica, titania, zirconia, amorphous carbon, or a combination thereof.

Embodiment 10

The method of any of the above embodiments, wherein the at least a portion of the first supported catalyst comprises at least about 90 vol % of the first supported catalyst that was exposed to the first feedstock.

Embodiment 11

The method of any of the above embodiments, wherein the at least a portion of the second supported catalyst comprises at least about 90 vol % of the second supported catalyst that was exposed to the first feedstock.

Embodiment 12

The method of any of the above embodiments, wherein the first feedstock has an oxygen content of about 1.0 wt %.

Embodiment 13

The method of any of the above embodiments, wherein the first feedstock comprises at least about 10 wt % of the bio-derived fraction.

Embodiment 14

The method of any of the above embodiments, further comprising exposing a third feedstock comprising a third mineral fraction and a bio-derived fraction to a first supported catalyst comprising a first Group VI metal and a Group VIII metal selected from Co or Ni under the first effective hydrodesulfurization conditions to form a first effluent, the third feedstock comprising at least about 0.5 wt % of oxygen, at least about 800 wppm of sulfur, and 35 wt % or less of the bio-derived fraction.

What is claimed is:

1. A method for hydroprocessing sulfur-containing feeds, comprising:
    exposing a first feedstock comprising a first mineral fraction and a bio-derived fraction to a first supported catalyst comprising a first Group VI metal and a Group VIII metal selected from Co or Ni under first effective hydrodesulfurization conditions, the first effective hydrodesulfurization conditions including a hydrogen partial pressure of about 500 psig (3.4 MPag) or less, to form a first effluent, the first feedstock comprising at least about 0.5 wt % of oxygen, at least about 800 wppm of sulfur, and from 1 wt % to 35 wt % of the bio-derived fraction;
    exposing the first effluent to a second supported catalyst comprising a second Group VI metal and a Group VIII metal selected from Co or Ni, in the presence of hydrogen under the first effective hydrodesulfurization conditions to form a first desulfurized product having a sulfur content of about 200 wppm or less, the selected Group VIII metal in the second catalyst being different from the selected Group VIII metal in the first catalyst;
    exposing a second feedstock comprising a second mineral fraction to at least a portion of the first supported catalyst in the presence of hydrogen under second effective hydrodesulfurization conditions to form a second effluent, the second effective hydrodesulfurization conditions including a hydrogen partial pressure of about 500 psig (3.4 MPag) or less, the second feedstock containing less than about 0.5 wt % of a bio-derived fraction and having a sulfur content of at least about 800 wppm, the at least a portion of the first supported catalyst comprising at least about 80 vol % of the first supported catalyst that was exposed to the first feedstock; and
    exposing the second effluent to at least a portion of the second supported catalyst in the presence of hydrogen under the second effective hydrodesulfurization conditions for forming a second desulfurized product having a sulfur content of about 200 wppm or less, the at least a portion of the second supported catalyst comprising at least about 80 vol % of the second supported catalyst that was exposed to the first feedstock,
    wherein the first supported catalyst and the second supported catalyst form a stacked bed of catalysts.

2. The method of claim 1, wherein at least one of the first Group VI metal and the second Group VI metal comprises Mo, W, or a combination thereof.

3. The method of claim 1, wherein the first effective hydrodesulfurization conditions comprise an LHSV of 0.3 to 5.0 hr$^{-1}$, a hydrogen partial pressure of at least about 200 psig (1.4 MPa), a treat gas containing at least about 80% hydrogen (remainder inert gas) with a hydrogen treat gas rate of about 500 scf/bbl (84 m$^3$/m$^3$) to about 10000 scf/bbl (1685 m$^3$/m$^3$), and a temperature of from about 500° F. (260° C.) to about 800° F. (427° C.).

4. The method of claim 3, wherein the second effective hydrodesulfurization conditions comprise an LHSV of 0.3 to 5.0 hr$^{-1}$, a hydrogen partial pressure of at least about 200 psig (1.4 MPa), a treat gas containing at least about 80% hydrogen (remainder inert gas) with a hydrogen treat gas rate of about 500 scf/bbl (84 m$^3$/m$^3$) to about 10000 scf/bbl (1685 m$^3$/m$^3$), and a temperature of from about 500° F. (260° C.) to about 800° F. (427° C.).

5. The method of claim 4, wherein the second effective hydrodesulfurization conditions comprise a hydrogen partial pressure that differs from a hydrogen partial pressure of the first effective hydrodesulfurization conditions by about 20% or less.

6. The method of claim 4, wherein the second effective hydrodesulfurization conditions comprise a temperature that differs from a reaction temperature of the first effective hydrodesulfurization conditions by about 20% or less.

7. The method of claim 1, wherein the first supported catalyst comprises Co and the first Group VI metal is Mo.

8. The method of claim 7, wherein the first effective hydrodesulfurization conditions comprise an LHSV of 0.3 to 5.0 hr$^{-1}$, a hydrogen partial pressure of about 300 psig (2.1 MPag) to about 400 psig (2.8 MPag), a treat gas containing at least about 80% hydrogen (remainder inert gas) with a hydrogen treat gas rate of about 500 scf/bbl (84 m$^3$/m$^3$) to about 10000 scf/bbl (1685 m$^3$/m$^3$), and a temperature of from about 500° F. (260° C.) to about 800° F. (427° C.).

9. The method of claim 1, wherein a support for at least one of the first supported catalyst and the second supported catalyst comprises alumina, silica, Mania, zirconia, amorphous carbon, or a combination thereof.

10. The method of claim 1, wherein the at least a portion of the first supported catalyst comprises at least about 90 vol % of the first supported catalyst that was exposed to the first feedstock.

11. The method of claim 1, wherein the at least a portion of the second supported catalyst comprises at least about 90 vol % of the second supported catalyst that was exposed to the first feedstock.

12. The method of claim 1, wherein the first feedstock has an oxygen content of about 1.0 wt %.

13. The method of claim 1, wherein the first feedstock comprises at least about 10 wt % of the bio-derived fraction.

14. A method for hydroprocessing sulfur-containing feeds, comprising:
    exposing a second feedstock comprising a second mineral fraction to a first supported catalyst comprising a Group VI metal and a Group VIII metal selected from Co or Ni in the presence of hydrogen under first effective hydrodesulfurization conditions to form a first effluent, the second feedstock containing less than about 0.5 wt % of a bio-derived fraction and at least about 800 wppm of sulfur, at least about 80 vol % of the first supported catalyst having been previously exposed to a first feedstock under first effective hydrodesulfurization conditions, the first feedstock comprising a first mineral fraction and a first bio-derived fraction and having an oxygen content of at least about 1.0 wt %, the first effective hydrodesulfurization conditions including a partial pressure of hydrogen of about 400 psig or less;
    exposing the first effluent to a second supported catalyst comprising a Group VI metal and a Group VIII metal selected from Co or Ni, in the presence of hydrogen under the second effective hydrodesulfurization conditions to form a first desulfurized product having a sulfur content of about 200 wppm or less, the selected Group VIII metal in the second catalyst being different from the selected Group VIII metal in the first catalyst, at least about 80 vol % of the second supported catalyst having been previously exposed to the first feedstock under the first effective hydrodesulfurization conditions;

exposing a third feedstock comprising a third mineral fraction and a third bio-derived fraction to at least a portion of the first supported catalyst in the presence of hydrogen under third effective hydrodesulfurization conditions to form a second effluent, the third feedstock having an oxygen content of at least about 0.5 wt %, a sulfur content of at least about 800 wppm, and containing from 1 wt % to about 35 wt % of the second bio-derived fraction, the at least a portion of the first supported catalyst corresponding to at least about 80 vol % of the first supported catalyst that was exposed to the second feedstock; and exposing the second effluent to at least a portion of the second supported catalyst in the presence of hydrogen under the effective hydrodesulfurization conditions for forming a second desulfurized product having a sulfur content of about 200 wppm or less, the at least a portion of the second supported catalyst corresponding to at least about 80 vol % of the second supported catalyst that was exposed to the second feedstock, wherein the first supported catalyst and the second supported catalyst form a stacked bed of catalysts.

\* \* \* \* \*